(12) United States Patent
Pöhmerer et al.

(10) Patent No.: US 7,886,588 B2
(45) Date of Patent: Feb. 15, 2011

(54) METHOD FOR DETERMINING CURRENT OXYGEN LOADING OF A 3-WAY CATALYTIC CONVERTER OF A LAMBDA-CONTROLLED INTERNAL COMBUSTION ENGINE

(75) Inventors: Wolf-Dieter Pöhmerer, Colomiers (FR); Volker Renz, Würzburg (DE); Gerd Rösel, Regensburg (DE); Milos Tichy, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 520 days.

(21) Appl. No.: 10/590,788

(22) PCT Filed: Dec. 6, 2004

(86) PCT No.: PCT/EP2004/053283

§ 371 (c)(1),
(2), (4) Date: Sep. 11, 2008

(87) PCT Pub. No.: WO2005/083250

PCT Pub. Date: Sep. 9, 2005

(65) Prior Publication Data

US 2008/0314023 A1 Dec. 25, 2008

(30) Foreign Application Priority Data

Feb. 27, 2004 (DE) .................. 10 2004 009 615

(51) Int. Cl.
*G01M 15/10* (2006.01)
(52) U.S. Cl. .................................. 73/114.75
(58) Field of Classification Search ............ 73/114.69, 73/114.71, 114.73, 114.75
See application file for complete search history.

(56) References Cited

U.S. PATENT DOCUMENTS

| 5,842,339 | A | 12/1998 | Bush et al. | |
| 6,694,243 | B2* | 2/2004 | Shi et al. | 701/114 |
| 2002/0069864 | A1 | 6/2002 | Takahashi et al. | |
| 2002/0116919 | A1 | 8/2002 | Rosel et al. | |
| 2002/0120386 | A1* | 8/2002 | Shi et al. | 701/114 |
| 2005/0166578 | A1 | 8/2005 | Pohmerer et al. | |
| 2008/0163608 | A1* | 7/2008 | Yacoub | 60/276 |
| 2009/0126344 | A1* | 5/2009 | Arlt et al. | 60/276 |

FOREIGN PATENT DOCUMENTS

| DE | 198 51 843 A1 | 5/2000 |
| DE | 199 53 601 C2 | 5/2001 |
| DE | 19953691 A1 | 5/2001 |
| DE | 100 39 709 A1 | 3/2002 |

(Continued)

OTHER PUBLICATIONS

Japanese Office Action, JP Application No. 2006-553462, 23 pages, Apr. 28, 2009.

*Primary Examiner*—Eric S McCall
(74) *Attorney, Agent, or Firm*—King & Spalding L.L.P.

(57) ABSTRACT

The invention relates to a method for determining the actual oxygen load of a 3-path catalyst of a lambda-controlled internal combustion engine, whereby a value for the actual oxygen load is calculated from the signal of a pre-catalyst lambda probe and the measured air mass flow rate by integration over time, whereby the post-catalyst lambda probe is initialized when the signal is interrupted.

14 Claims, 5 Drawing Sheets

FOREIGN PATENT DOCUMENTS

| | | |
|---|---|---|
| DE | 102 01 989 A1 | 7/2003 |
| DE | 102 20 337 A1 | 11/2003 |
| EP | 1718853 A1 | 11/2006 |
| JP | 2003049639 A | 2/2003 |
| WO | WO 9947795 A2 | 9/1999 |
| WO | WO 0109490 A1 | 2/2001 |
| WO | WO2005/083250 | 9/2005 |

* cited by examiner

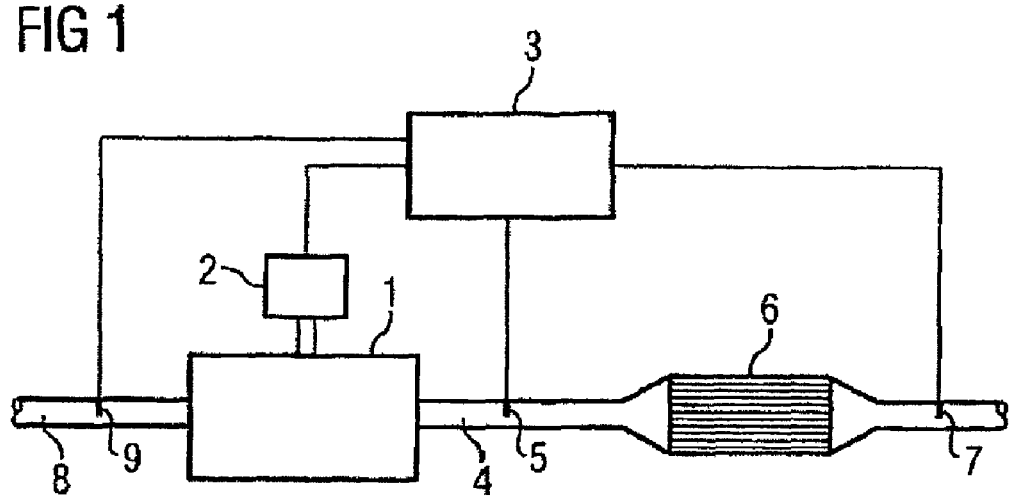
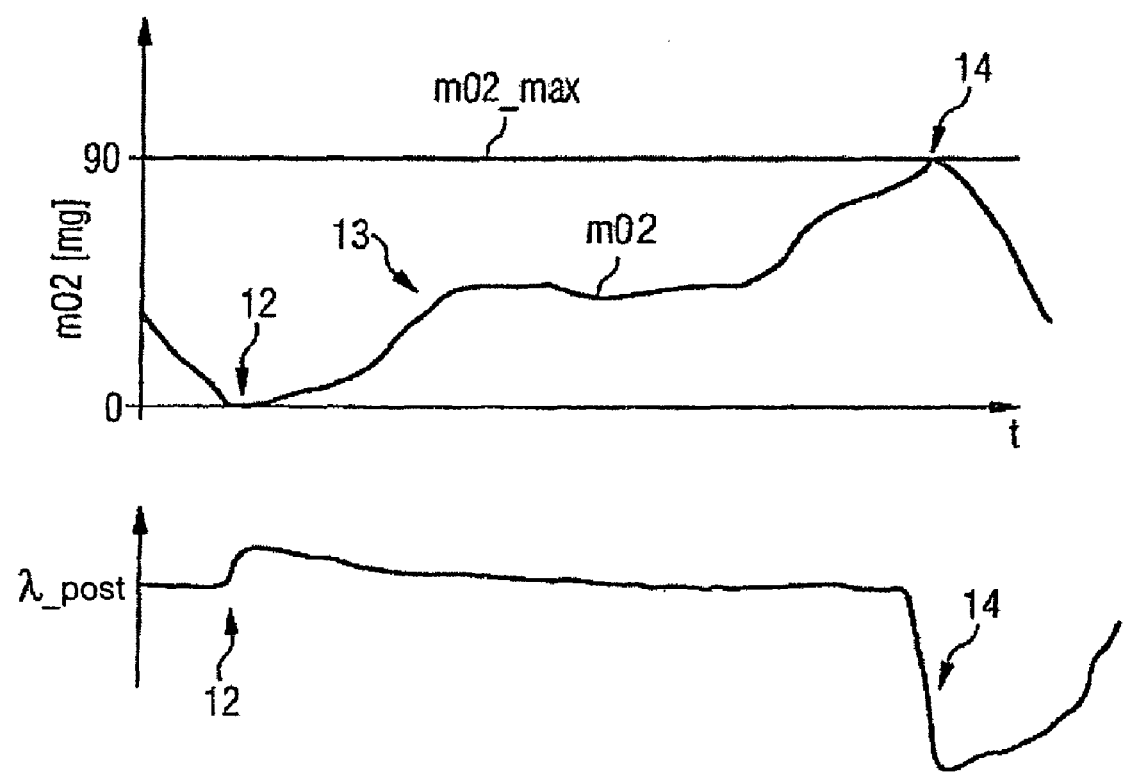

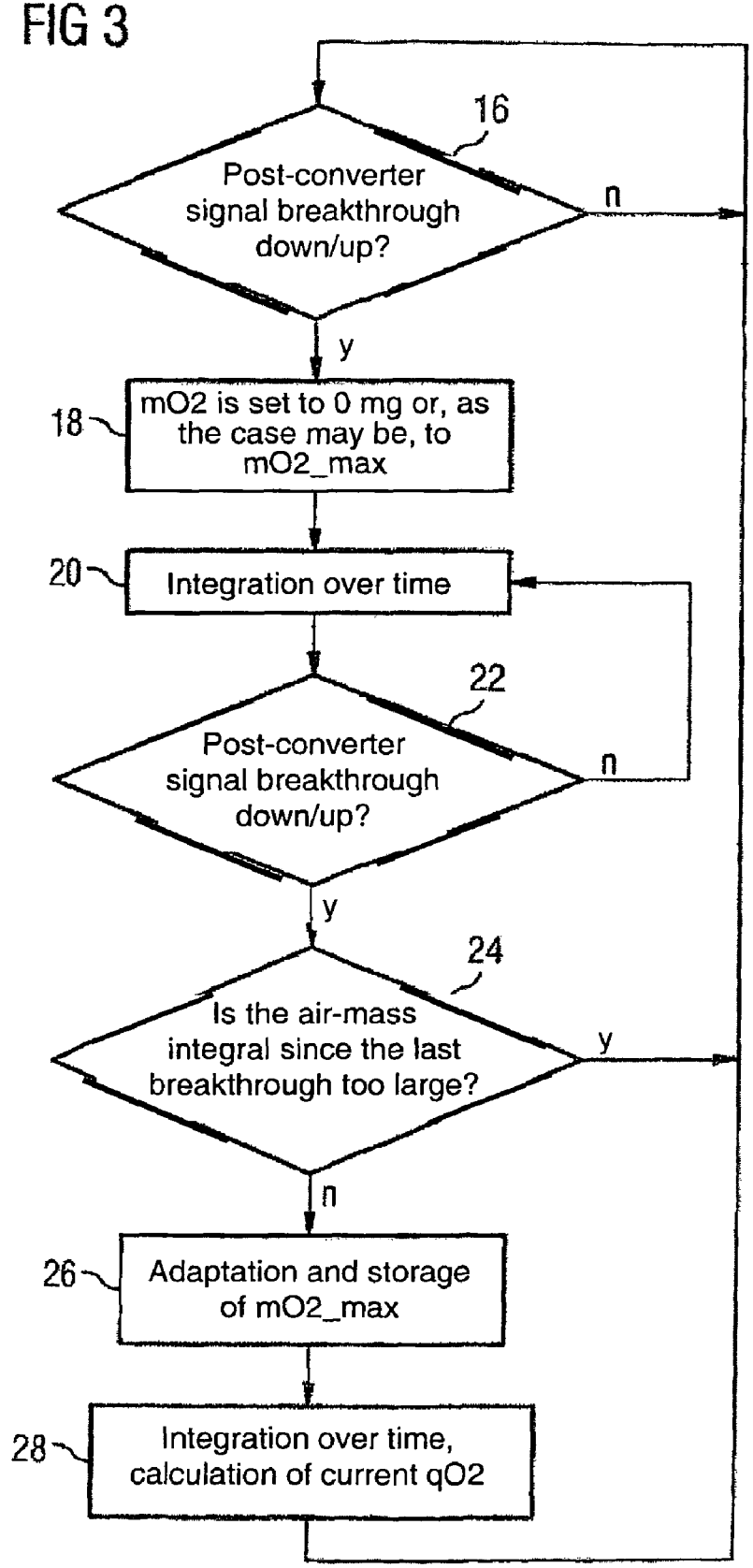

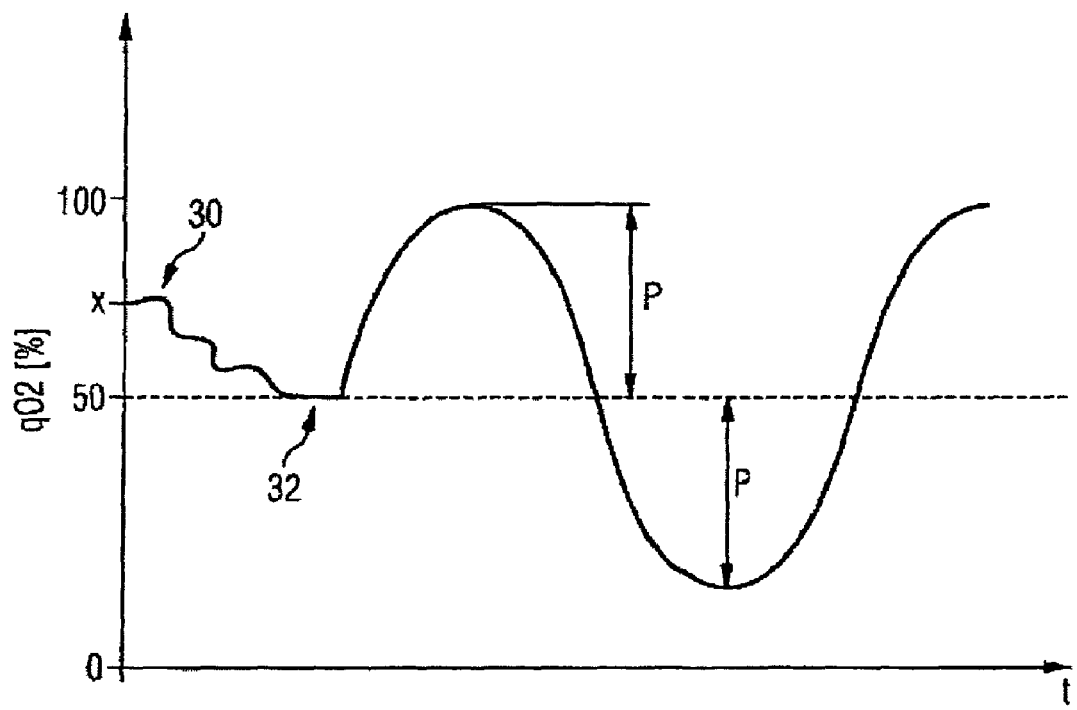

METHOD FOR DETERMINING CURRENT OXYGEN LOADING OF A 3-WAY CATALYTIC CONVERTER OF A LAMBDA-CONTROLLED INTERNAL COMBUSTION ENGINE

CROSS REFERENCE TO RELATED APPLICATIONS

This application is the US National Stage of International Application No. PCT/EP2004/053283, filed Dec. 6, 2004 and claims the benefit thereof. The International Application claims the benefits of German Patent application No. 10 2004 009 615.5 filed Feb. 27, 2004. All of the applications are incorporated by reference herein in their entirety.

FIELD OF THE INVENTION

The invention relates to a method for determining current oxygen loading of a 3-way catalytic converter of a lambda-controlled internal combustion engine having a linear pre-converter lambda probe connected upstream of the catalytic converter, a post-converter lambda probe connected downstream of the catalytic converter, and a device for measuring the air-mass flow rate. The invention is furthermore directed toward a number of methods for regulating, controlling, and/or monitoring the exhaust treatment of a lambda-controlled internal combustion engine that use the values determined by means of the inventive method for the catalytic converter's current oxygen loading.

BACKGROUND OF THE INVENTION

A 3-way catalytic converter can only convert pollutants in an optimal manner if the fuel/air ratio is within a narrow range around lambda≈1. Said range is referred to also as the catalytic-converter window. Only with fuel/air ratios of said kind will the exhaust composition be such that the oxygen released when the nitrogen oxides are reduced will suffice to almost completely oxidize the exhaust gas's HC and CO components into $CO_2$ and $H_2O$. Mixing is therefore controlled in an internal combustion engine having a 3-way catalytic converter by what is termed a lambda controller to a target value of lambda≈1. To compensate brief fluctuations in the fuel/air ratio the catalytic converter also contains a coating (washcoat) made of a material, for example $Ce_2O_3$ (di-cerium trioxide), that can briefly store oxygen and will bind or release it as and when required.

A linear pre-converter lambda probe is arranged upstream of the catalytic converter so that mixing can be controlled. Said probe measures the residual oxygen component contained in the exhaust gas. A post-converter lambda probe downstream of the catalytic converter serves to monitor the catalytic converter function. The catalytic converter's oxygen storage capacity is therein checked using what is termed OSC-based catalytic-converter diagnosing (OSC=oxygen storage capacity). Rich/lean oscillating of the mixture is produced for this purpose through pre-controlling by the lambda controller. An intact catalytic converter will compensate oscillating using its oxygen storage capacity so that the post-converter lambda probe's probe voltage will oscillate with only a small amplitude. If, though, the catalytic converter has lost its oxygen storage capacity through ageing, the residual oxygen content will be similar upstream and downstream of the catalytic converter and the post-converter lambda probe's signal will oscillate widely.

The post-converter lambda probe is often used, moreover, to compensate long-term drifting in the pre-converter lambda probe's signal. This is referred to also as trimming.

The post-converter lambda probe's signal is therefore usually constant in the case of a catalytic converter having sufficient oxygen storage capacity and a properly functioning lambda controller. If the signal rises or falls, the catalytic converter has been either sated with oxygen or completely emptied of oxygen so that it will no longer be able to compensate a fluctuation in the fuel/air ratio. This is referred to also as "breaking through" of the post-converter lambda probe's signal to a rich or, as the case may be, lean mixture.

Breaking through of the post-converter lambda-probe signal hence indicates that the catalytic converter's oxygen storage capacity is exhausted or that no more oxygen is stored. However, no information is available between said two limiting values about the catalytic converter's actual, current oxygen loading. Said information would, though, be very helpful for maintaining the oxygen loading at around half the storage capacity and hence for providing the same buffering on the rich and lean side, as a result of which breaking through of the post-converter lambda-probe signal will be preventively avoided and the most favorable conditions for catalytic-converter diagnosing furthermore created.

SUMMARY OF THE INVENTION

The object of the invention is therefore to provide a method for determining current oxygen loading of a lambda-controlled internal combustion engine's 3-way catalytic converter.

Said object is achieved by means of the invention defined in the claims.

Advantageous developments of the invention are the subject of the subclaims.

The method for determining current oxygen loading employs the signals of a linear pre-converter lambda probe, of a post-converter lambda probe, and of a device for measuring the air-mass flow rate, with a value for current oxygen loading being calculated from the pre-converter lambda probe's signal and from the measured air-mass flow rate by integration over time and said value being set to 0 if the post-converter lambda probe's signal breaks through to rich mixtures, because breaking through indicates that no more oxygen is stored in the catalytic converter. Integrated faults, for example measuring faults in the air-mass flow rate or in the pre-converter lambda probe's signal, will be reset through said calibrating.

The value for current oxygen loading is preferably calculated using the formula $$mO2 = [O2]_{air} \int_0^\tau \left(1 - \frac{1}{\lambda}\right) \dot{m}L \, dt,$$

where mO2 is the current oxygen loading, $\lambda$ is the pre-converter lambda probe's signal, $\dot{m}L$ is the air-mass flow rate, and $[O2]_{air}$ is the mass component of oxygen in air. The latter is about 23%. The values for $\lambda$ and mL are time-dependent.

If current oxygen loading is determined continuously in this manner it will also be possible to calculate a value for the catalytic converter's oxygen storage capacity. In the case of breaking through to a lean mixture the new value for the oxygen storage capacity is for this purpose calculated from the difference between the integrated oxygen loading and a hitherto adapted value for the oxygen storage capacity. That is because breaking through indicates that the catalytic converter's maximum oxygen storage capacity has been reached. Since the oxygen storage capacity also depends on certain operating parameters, the adapted value can optionally additionally be multiplied by a working-point-dependent factor that has been taken from a corresponding characteristics map and corrected thereby.

In the case of breaking through to a lean mixture the current oxygen loading can furthermore be set to the adapted value for the catalytic converter's oxygen storage capacity.

The current oxygen quotient is preferably additionally calculated from the quotient of the catalytic converter's current oxygen loading and oxygen storage capacity. Said value will be especially helpful if it is desired, for example, to keep the oxygen loading at a certain value to preventively avoid emissions.

In preferred embodiments of the invention the values calculated according to the method described above for current oxygen loading, oxygen storage capacity, and/or the current oxygen quotient are used in conjunction with different methods for regulating, controlling, and/or monitoring the exhaust treatment of a lambda-controlled internal combustion engine.

A first application is in OSC-based catalytic-converter diagnosing. Rich/lean oscillating resulting in maximum oxygen loading of the catalytic converter is therein set by means of forced activation or, as the case may be, pre-controlling of the fuel/air ratio. Maximum oxygen loading is selected to be still just manageable by a borderline catalytic converter exhibiting maximum permissible ageing without causing the post-converter probe signal to break through. This diagnostic method is implemented within the scope of OBD (on-board diagnosis) at intervals controlled by the ECU (electronic control unit). For said OSC-based diagnosing it is, however, of major importance prior to the start of forced activation to have set a defined oxygen loading necessary for diagnosing. The transition from lower nominal to maximum oxygen loading for catalytic-converter diagnosing therefore takes place in several steps in the prior art because the catalytic converter's loading condition is to a very large extent unknown and high additional oxygen loading can result in an oxygen quotient of below 0% or above 100% and hence in emissions behind the catalytic converter requiring to be diagnosed. The conventional function of trimming via the post-converter signal is to indirectly set mean oxygen loading during the transitional phase in such a way that OBD borderline catalytic-converter loading will only cause breaking through in the case of a borderline catalytic converter. This setting operation lasts a few forced-activation periods, however, and so requires additional time in the driving cycle the result of which can be that the number of diagnostic cycles necessary for catalytic-converter diagnosing cannot be performed in one piece or that the transitional phase for diagnosing will be interrupted without having determined a valid diagnostic value, resulting in avoidable emissions.

In a preferred embodiment of the invention the oxygen quotient is therefore set by the lambda controller prior to the start of diagnosing to a predetermined target value necessary for diagnosing. Said target value is selected in such a way that forced activation for catalytic-converter diagnosing will actuate the catalytic converter possibly only slightly, as a result of which the influence of catalytic-converter diagnosing on emissions will be minimal. Preconditioning of the catalytic converter for setting oxygen loading is implemented thereby and the process of changing over to OBD borderline catalytic-converter forced activation substantially accelerated.

Owing to the more precisely known level of oxygen loading, breaking through of the post-converter lambda-probe signal during catalytic-converter diagnosing can furthermore be implemented in a more reproducible manner and spreading of the individual diagnostic cycles consequently minimized. The overall accuracy of catalytic-converter diagnosing is improved thereby.

As the inventive method enables the catalytic converter's oxygen storage capacity to be determined, OSC-based catalytic-converter diagnosing can alternatively also be dispensed with entirely since conclusions about the catalytic converter's ageing condition can be drawn directly from the information about the oxygen storage capacity. However, that will only apply if the linear pre-converter lambda probe's signal and the available information about the air-mass flow rate are accurate enough for determining a sufficiently reliable value for the oxygen storage capacity. Replacing the OSC method has the advantage that active and emission-influencing forced activation is no longer necessary. At least preliminary information about the catalytic converter's condition of ageing can be generated by the determined maximum oxygen storage capacity.

In contrast to conventional catalytic-converter diagnosing methods the proposed approach allows the oxygen storage capacity to be determined on a permanent basis, although it must be said that different values for the oxygen storage capacity can occur owing to differing allowance being made for surface-storage and deep-storage effects.

A further preferred embodiment of the invention is controlled rinsing of the catalytic converter after an overrun fuel-cutoff phase. The catalytic converter is sated with oxygen after overrun fuel-cutoff phases, making it necessary to enrich the mixture in order to "rinse" the catalytic converter, which is to say to reset it as quickly as possible to an oxygen quotient of approximately 50%. The values determined for the oxygen storage capacity and oxygen loading allow a loading model to be set up in which enriching for "rinsing" the catalytic converter up to a defined oxygen quotient is pre-specified that has been matched to the converter characteristics (ageing, for example) and in which the oxygen quotient is controlled to the target value by the lambda controller after an overrun fuel-cutoff phase. $NO_x$ and HC/CO emissions are thus very largely avoided.

In a further preferred embodiment of the invention the lambda controller is set in such a way that the oxygen quotient is controlled to a specific target value of, for example, 50%. 50% is in most operating conditions the optimal setting for the oxygen quotient as that provides the catalytic converter's maximum oxygen buffer reserves for non-stationary operations or faults in general in the fuel/air ratio in the case of departures toward either a rich or a lean mixture. It enables a lambda controller that performs local oxygen balancing by means of the $I^2$ component to be greatly simplified and even ensures complete balancing. A separation is also provided between regulating and balancing.

The values determined for the oxygen quotient are preferably used also for controlling or, as the case may be, prioritizing the regulating and controlling interventions of the lambda controller, the trimming controller, and forced-activation means during OSC diagnosing. All regulating and controlling interventions of the lambda controller, forced-activation means, and trimming controller will make the mixture richer or leaner. The different information sources for this (post-converter signal for trimming and pre-converter signal for lambda controlling) result in temporally displaced interventions. Pre-controlling of forced activation is overlaid. If current oxygen loading or, as the case may be, the current oxygen quotient is known, the interventions can then be assessed as a function of the loading level. A provided controlling or regulating intervention for making the mixture leaner will preferably not take place if the oxygen quotient is above a predetermined first threshold value and a provided controlling or regulating intervention for making the mixture richer will preferably not take place if the oxygen quotient is below a predetermined second threshold value. A lean phase of forced activation can alternatively also be prevented if the oxygen quotient is above the first threshold value. The trimming controller's deferred intervention can furthermore be assessed. If, for instance, the intervention which the trimming controller would make based on the post-converter lambda-probe signal has already been compensated through other measures (for example by the lambda controller's reaction to a fault), then said intervention can be omitted.

Minor faults can also be compensated by varying the period lengths of forced activation. For example, enriching which the lambda controller would like to carry out takes place instead by not changing over to the lean half-wave in forced activation or by extending the rich half-wave. This type of regulator intervention can be referred to as fine tuning.

BRIEF DESCRIPTION OF THE DRAWINGS

Exemplary embodiments of the inventive method are described in more detail below with the aid of the attached drawings.

FIG. 1 is a diagrammatic representation of an internal combustion engine for implementing the inventive method, FIG. 2 is an exemplary time curve of current oxygen loading and of the signal of the post-converter lambda probe, FIG. 3 is a flowchart of a procedural flow in diagrammatic form, FIG. 4 is an exemplary time curve of the oxygen quotient prior to and during OSC diagnosing.

DETAILED DESCRIPTION OF THE INVENTION

Figure 5:
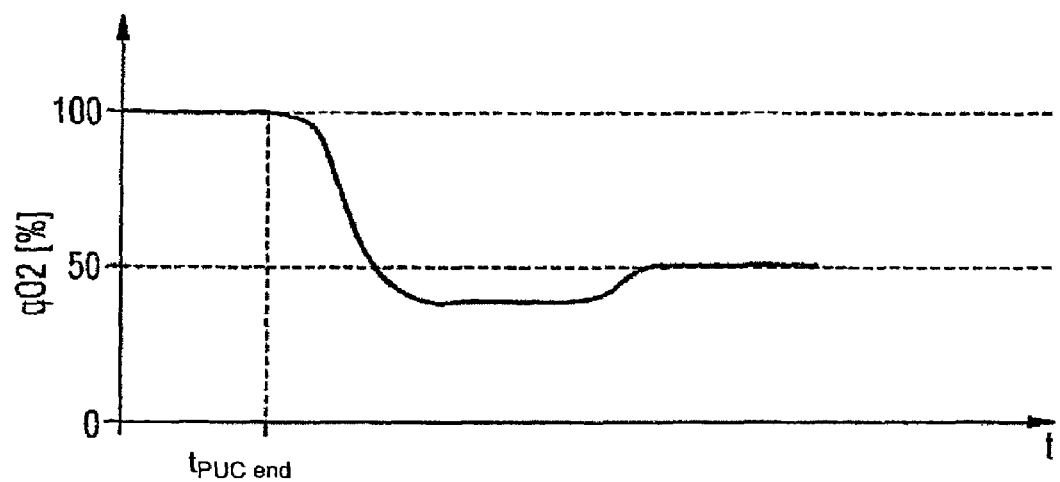
FIG. 5 is an exemplary time curve of the oxygen quotient while the catalytic converter is being rinsed.

FIG. 1 shows an internal combustion engine 1 having a fuel-feed system [2] and a control device 3. The fuel-feed system 2 is controlled by the control device 3 via leads, which are not referenced further, and takes care of the fuel allocation needs of the internal combustion engine 1. A 3-way catalytic converter 6 is located in the exhaust tract 4 of said combustion engine 1. Provided upstream of the catalytic converter 6 is a pre-converter lambda probe 5 for performing lambda controlling and provided downstream of said converter is a post-converter lambda probe 7 for measuring the lambda value. Said pre-converter lambda probe 5 is a linear lambda probe, while what is termed a binary lambda probe is used here as the post-converter lambda probe 7 in which the output voltage in the range lambda=1 virtually jumps from, for instance, below 100 mV in the case of lean mixtures (lambda>1) to over 0.7 V in the case of rich mixtures (lambda<1); this is referred to also as two-output. Both lambda probes supply their measured values via leads, which are not referenced further, to the control device 3. In the intake tract 8 is an air-mass sensor 9 which is located in, for example, the intake pipe and supplies its measured values to the control device 3 via leads that are not referenced further. The air-mass flow rate can alternatively also be calculated with the aid of corresponding other sensors indirectly from the throttle-valve position, or, as the case may be, intake-pipe pressure and the rotational speed. The values obtained by further sensors, in particular the rotational speed, the catalytic-converter temperature, etc., are also ducted to the control device 3. The control device 3 controls the operation of the internal combustion engine 1 with the aid of said values.

When the internal combustion engine 1 is operating the catalytic treatment of exhaust gas is regulated in the exhaust tract 4 as follows: The fuel feed in the fuel-feed system 2 is regulated in such a way that the signal of the pre-converter lambda probe 5 performs a slight oscillation around $\lambda \approx 1$. In a standard lambda probe a voltage level of 450 mV, for example, corresponds to the value $\lambda \approx 1$. The signal of the pre-converter lambda probe 5 oscillates around said value so that exhaust gas having the value $\lambda \approx 1$ is on average supplied to the catalytic converter 6. The post-converter lambda probe 7 measures the lambda value in the treated exhaust gas downstream of the catalytic converter 6. Said probe's signal will be approximately constant if the catalytic converter is intact and the lambda controller has been set well. Only in certain operating conditions such as, for example, following fuel cutoff on overrun or during forced activation during OSC diagnosing, will the post-converter lambda probe's signal change abruptly up or down and indicate thereby that the catalytic converter's maximum oxygen storage capacity has been reached or that the oxygen reserve is exhausted. This is referred to also as breaking through of the post-converter probe signal.

FIG. 2 is an exemplary time curve of the oxygen loading mO2 of the catalytic converter 6 which is integrated from the signal of the pre-converter lambda probe 5 and from the air-mass meter 9 using the formula $$mO2 = [O2]_{air} \int_0^t \left(1 - \frac{1}{\lambda}\right) \dot{m}L \, dt.$$

mO2 is therein the current oxygen loading, $\lambda$ is the pre-converter lambda probe's signal, $\dot{m}L$ is the air-mass flow rate, and $[O2]_{air}$ is the mass component of oxygen in air, which is about 23%. The signal of the post-converter lambda probe $\lambda\_post$ is shown by way of example under the time curve of mO2.

The time curve shown for mO2 initially falls, which is to say that a rich mixture is being ducted to the catalytic converter. The catalytic converter's stored oxygen is exhausted at 12 so that the post-converter lambda-probe signal swings upward, which is to say toward rich mixtures. It is detected from this breakthrough that mO2 has the value 0 mg at this instant. The value for mO2 can as a result be calibrated to 0 mg. The value for mO2 thereafter rises again until held for a while by the lambda controller in the proximity of a mean value 13. Oxygen loading subsequently rises further owing, for example, to brief overrun fuel-cutoff phases during which the fuel supply is throttled. The catalytic converter's oxygen storage capacity has been reached at 14 and the signal of the post-converter lambda probe 7 swings downward because the oxygen content downstream of the catalytic converter 7 is increasing. This breakthrough is registered by the control device 3 and is used to calculate adapting of the oxygen storage capacity mO2_max. The difference between the previous adapted value and current oxygen loading is calculated therefor and the new adapted value of the oxygen storage capacity calculated therefrom. Current oxygen loading (90 mg in the example shown) is then set as equaling the oxygen storage capacity mO2_max.

FIG. 3 is a flowchart of an exemplary method for calculating and initializing the value for current oxygen loading mO2. Said method begins at step 16 with a first initializing following breaking through of the post-converter lambda probe signal up or down. If the signal swings upward, the lambda value downstream of the catalytic converter will be too low and the catalytic converter's oxygen buffer thus completely empty. mO2 is therefore set to the value 0 (step 18). Current values for mO2 are continuously determined in step 20 through integration over time. This continues until further breaking through of the post-converter lambda probe's signal is determined in step 22. That can point, for example, in the direction opposite that in step 16, meaning downward. Said breakthrough indicates that the catalytic converter's oxygen storage capacity is exhausted. A new value for the oxygen storage capacity mO2_max can hence be calculated by comparing the value for mO2 calculated through integration in step 20 with the last assumed value for the oxygen storage capacity.

That, though, is to be recommended only if the value integrated between the two breakthroughs in 16 and 22 for the air-mass flow rate is not excessively high because the measured values for the air-mass flow rate and also for the lambda value contain measuring errors. Said measuring errors are integrated in step 20 and accumulate over time. An inquiry is therefore made at 24 to establish whether the air-mass flow rate integrated since the last breakthrough is excessively high, and only if the air-mass integral is below a certain threshold value will the value for mO2_max be adapted, which is to say recalculated, and stored in the control device (step 26). Integration over time is then resumed for continuously determining current values for mO2 (step 28). Said newly determined current values are additionally divided by the adapted oxygen storage capacity to continuously obtain values for the current oxygen quotient qO2. Said steps are possibly repeated each time the post-converter lambda-probe signal breaks through in order to avoid an accumulation of measuring errors and to continuously obtain new values for the catalytic converter's maximum oxygen storage capacity.

FIGS. 4-8 show the time curve of the oxygen quotient qO2 for different applications and exemplary embodiments of the inventive method.

FIG. 4 is the time curve for qO2 shortly before and during OSC-based catalytic-converter diagnosing. The oxygen quotient happens to have a relatively high value X at the instant 30. The maximum oxygen capacity corresponding to a value of qO2=100% would be reached in a short time were forced activation to start at this particular instant, and that would result in increased $NO_x$ output. That cannot be avoided with a conventional lambda controller because the value X for the current oxygen quotient is not known. However, qO2 is calculated continuously in this exemplary embodiment of the invention, making it possible to set a defined oxygen quotient necessary for diagnosing before forced activation commences. Said value is 50% in the example shown and is reached at the instant 32. That is when forced activation begins, during which mixing is subjected to a rich/lean oscillation. Loading of the catalytic converter, and hence the calculated oxygen quotient, consequently fluctuates with an amplitude P. The maximum values 0% and 100% are not reached during said oscillating in the example shown so that the post-converter lambda probe signal does not break through and a catalytic converter still capable of functioning is diagnosed.

Figure 6:
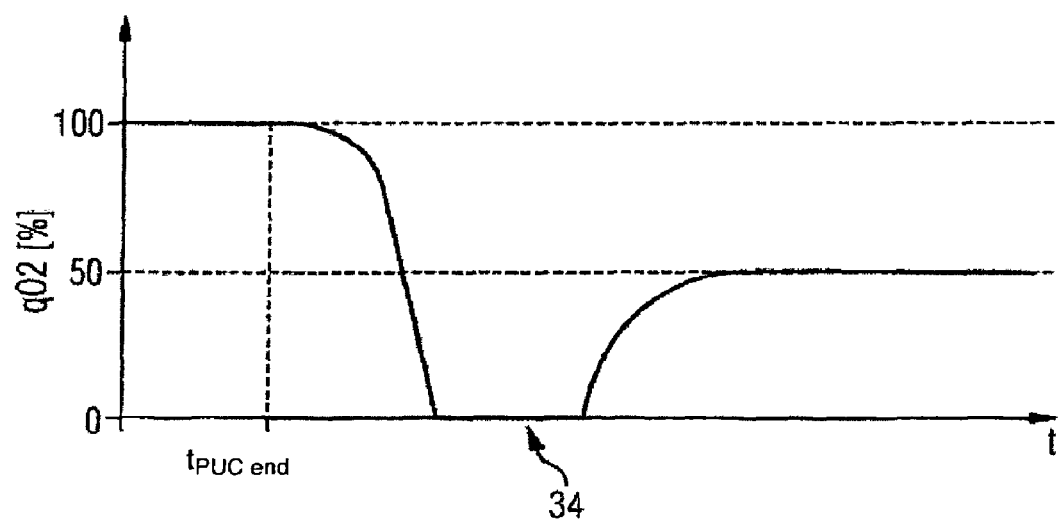
FIG. 6 is an exemplary time curve of the oxygen quotient while a main catalytic converter is being rinsed and the pre-converter is being actuated.

FIGS. 5 and 6 show exemplary targeted curves of the oxygen quotient while the catalytic converter is being rinsed. The overrun fuel-cutoff phase has ended in each case at the instant $t_{PUC\ end}$ (PUC=pull fuel cutoff). The catalytic converter is sated with oxygen at said instant. The mixture is enriched from time to time in order to reset the catalytic converter as quickly as possible to an oxygen quotient of approximately 50%. Where possible, though, the catalytic converter should not to be rinsed too forcefully as CO and HC emissions will otherwise occur. A loading model in which a target value and, where applicable, a targeted curve for the oxygen quotient are set is therefore established with the aid of the known variables "oxygen storage capacity" and "oxygen quotient".

For a main catalytic converter the result is, for example, the curve shown in FIG. 5 for the oxygen quotient.

If, alongside the main catalytic converter, there is also a pre-converter, then that should also be "rinsed". A further loading model will thus furthermore allow the defined setting in the pre-converter of an oxygen concentration in which a reduction can also be represented when the main catalytic converter has been rinsed (during which the pre-converter will be "activated"). FIG. 6 is a possible curve of the oxygen quotient in the pre-converter while a main catalytic converter is being rinsed, during which the pre-converter is "activated" at 34.

Since a suitable rinsing level can now be determined with the aid of actual oxygen loading, rinsing can in a further embodiment also be initiated after a brief overrun fuel-cutoff phase during which the post-converter lambda-probe signal has not reacted at all. Said rinsing level can also be adjusted to the catalytic converter's ageing condition.

Figure 7:
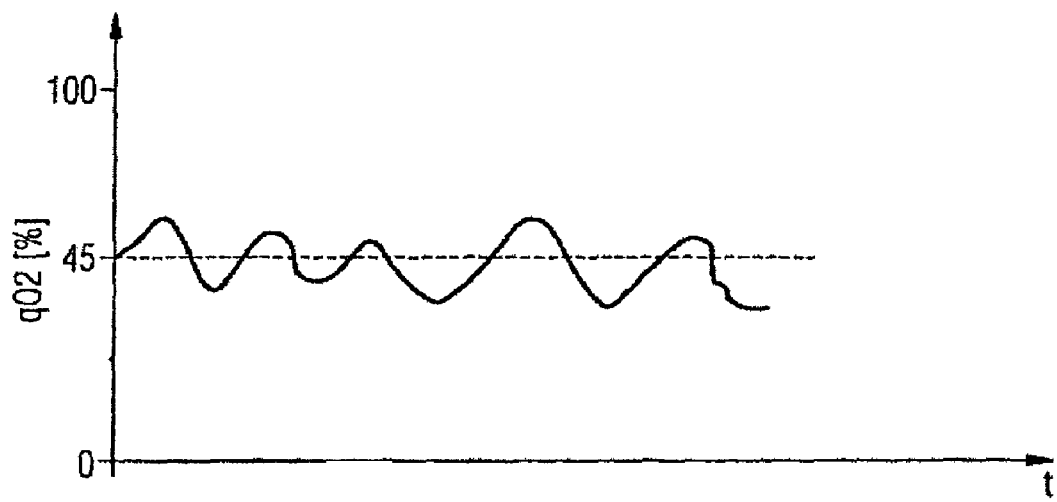
FIG. 7 is an exemplary time curve of the oxygen quotient for the lambda controller.

In another development of the invention a lambda controller is used having a value of approximately 50% (45% in the example shown) as the target value for the oxygen quotient qO2. The catalytic converter's maximum oxygen buffer reserves for non-stationary operations or faults in general in the air/fuel-mixture—for departures toward either a rich or a lean mixture—will always be provided when the oxygen quotient is 50%. The buffer for lean mixtures will be somewhat larger if the oxygen quotient is 45%, which is advantageous for avoiding $NO_x$ emissions. FIG. 7 shows by way of example the curve of an oxygen quotient controlled by the lambda controller to 45%.

Figure 8:
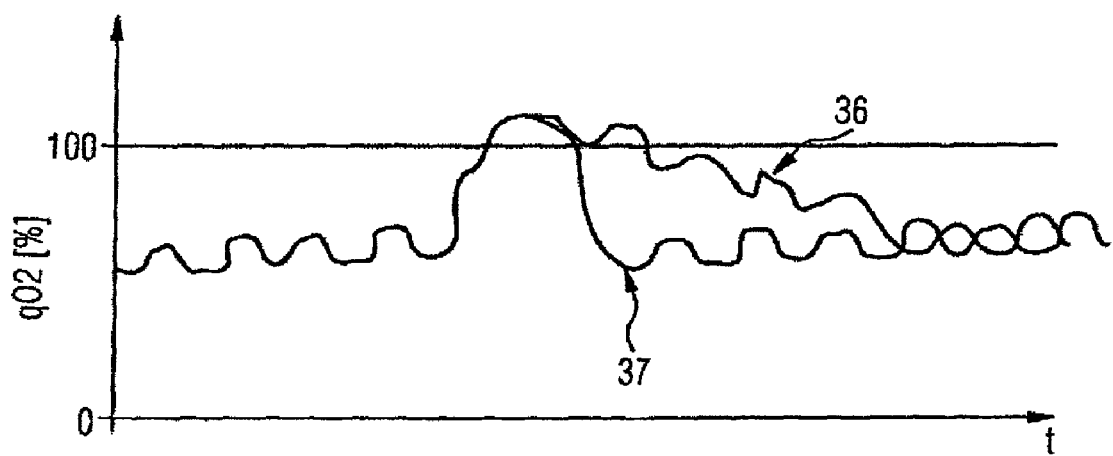
FIG. 8 is an exemplary time curve of the oxygen quotient after a fault with and without intervention coordinating.

Finally, FIG. 8 shows an example of a further embodiment of the invention wherein the information about the current oxygen quotient is used to compensate a fault in the air/fuel-composition as quickly as possible. Curve 36 shows the present-day solution in which the regulating and controlling interventions of the lambda controller, trimming controller, and forced activation are not prioritized. Because of the different information sources for said controllers (post-converter signal for trimming and pre-converter signal for lambda controlling), said controllers' interventions are in part temporally displaced, causing the fault to be corrected less quickly. Curve 37, by contrast, shows the value of the oxygen quotient with the interventions being coordinated, with, for example, an intervention, that the trimming controller would perform based on the post-converter signal, being omitted if said intervention has already been compensated through other measures. Furthermore, a lean phase of forced activation, for example, can be prevented if oxygen loading exceeds a threshold.

The inventive method enables a 3-way catalytic converter's current and maximum oxygen loading to be determined on a permanent basis and the emissions to be reduced through selective interventions based on said information. The described controlling, regulating, and monitoring methods furthermore allow reduced emissions, shorter times, and improved accuracy of catalytic-converter diagnosing, in particular for systems without a second catalytic converter. Continuous information on ageing is moreover provided by way of the catalytic converter's condition so that functions such as, for instance, rinsing of said converter following overrun fuel-cutoff can be adapted, which also contributes to emission reduction. Finally, a further reduction in emissions can be achieved as a result of coordinating controlling and regulating interventions as a function of the loading level.

The invention claimed is:

1. A method for determining current oxygen loading of a 3-way catalytic converter of a lambda-controlled internal combustion engine, comprising:
   determining a pre-converter lambda value of the engine exhaust gas upstream of the catalytic converter by a linear pre-converter lambda probe;
   determining a lambda value of the engine exhaust gas downstream of the catalytic converter by a post-converter lambda probe;
   determining an intake air mass flow rate by an intake air mass flow rate measuring device;
   calculating a relative value for current oxygen loading of the catalytic converter from the pre-converter lambda value and the determine air mass flow rate through integration over time;
   initializing the current oxygen loading relative value using the post-converter lambda probe value at time intervals in order to obtain an absolute value for current oxygen loading;
   calculating a maximum oxygen storage capacity of the catalytic converter; and
   calculating a current oxygen quotient from a quotient of current oxygen loading and the maximum oxygen storage capacity of the catalytic converter to aid in the regulation of engine emission output.

2. The method as claimed in claim 1, wherein the relative value for current oxygen loading is calculated using the formula:

$$mO2 = [O2]_{air} \int_0^\tau \left(1 - \frac{1}{\lambda}\right) mL \, dt,$$

where mO2 is the current oxygen loading, $\lambda$ is the pre-converter lambda probe's signal, mL is the air-mass flow rate, and $[O2]_{air}$ is the mass component of oxygen in air.

3. The method as claimed in claim 2, wherein the relative value for current oxygen loading will be initialized if the post-converter lambda probe value indicates a rich or lean mixture.

4. The method as claimed in claim 3, wherein the maximum oxygen storage capacity of the catalytic converter is determined by integration over time between two rich mixture or lean mixture indications of the post-converter lambda probe value.

5. A method for regulating an exhaust treatment of a lambda-controlled internal combustion engine having a lambda controller and a 3-way catalytic converter, comprising:
   a post-converter lambda probe connected downstream of the catalytic converter, comprising:
   measuring the mass flow rate of intake air of the engine by a air-mass flow rate measuring device;
   measuring a pre-converter lambda value of an exhaust gas of the engine by a linear pre-converter lambda probe connected upstream of the catalytic converter;
   measuring a post-converter lambda value of an exhaust gas of the engine by a post-converter lambda probe connected downstream of the catalytic converter;
   calculating a relative value for current oxygen loading of the catalytic converter from the pre-converter lambda value and from the measured air-mass flow rate by integrating over time;
   initializing the current oxygen loading relative value via the post-converter lambda probe value at intervals in order to obtain an absolute value for current oxygen loading;
   calculating a maximum oxygen storage capacity of the catalytic converter; and
   calculating a current oxygen quotient from a quotient of current oxygen loading and the maximum oxygen storage capacity of the catalytic converter to assess the regulation of engine emission output as a function of the current oxygen loading level of the catalytic converter.

6. The method as claimed in claim 5, wherein the lambda controller controls the oxygen quotient to a target value of 50%.

7. The method as claimed in claim 5, wherein the lambda controller does not lean the mixture if the oxygen quotient is above a predetermined first threshold value, and does not richen the mixture if the oxygen quotient is below a predetermined second threshold value.

8. The method as claimed in claim 5, wherein the combustion engine is operated by the lambda controller such that the pre-converter lambda probe value oscillates about lambda=1.

9. The method as claimed in claim 8, wherein for diagnostic purposes, oscillation of the pre-converter lambda probe value is set by the lambda controller to a pre-determined loading of the catalytic converter which changes periodically with the oscillation and is above standard operational loading.

10. The method as claimed in claim 9, wherein the catalytic converter is determine to be defective if the oscillation characteristics of the post-converter lambda probe value are outside a target range.

11. The method as claimed in claim 10, wherein the oxygen quotient is set to a predetermined target value necessary for diagnosing prior to the start of diagnosing.

12. The method as claimed in claim 11, wherein the calculated maximum oxygen storage capacity of the catalytic converter is compared with a predetermined threshold value.

13. The method as claimed in claim 12, wherein the catalytic converter is rinsed after an overrun fuel-cutoff phase where
   a target curve for the oxygen quotient after an overrun fuel-cutoff phase is pre-determined and matched to the converter characteristics and the oxygen quotient is controlled to the target curve by the lambda controller after an overrun fuel-cutoff phase.

14. A system for regulating the emission output of an internal combustion engine, comprising:
   a 3-way catalytic converter;
   a pre-converter linear lambda probe arranged in an exhaust stream of the internal combustion engine up-stream of the catalytic converter;
   a post-converter lambda probe arranged in an exhaust stream of the internal combustion engine down-stream of the catalytic converter;
   a intake air mass flow sensor arranged in an air intake pipe of the internal combustion engine; and a lambda controller that regulates the operation of the internal combustion engine by:

measuring the mass flow rate of intake air of the engine by the air mass flow sensor, measuring a pre-converter lambda value of an exhaust gas of the engine by the pre-converter lambda probe, measuring a post-converter lambda value of the exhaust gas of the engine by the post-converter lambda probe, calculating a relative value for current oxygen loading of the catalytic converter from the pre-converter lambda value and from the measured air mass flow rate by integrating over time, initializing the current oxygen loading relative value via the post-converter lambda probe value at intervals in order to obtain an absolute value for current oxygen loading, calculating a maximum oxygen storage capacity of the catalytic converter, and calculating a current oxygen quotient from a quotient of current oxygen loading and the maximum oxygen storage capacity of the catalytic converter to assess the regulation of engine emission output as a function of the current oxygen loading level of the catalytic converter.

* * * * *